[19] 3,572,907

| [72] | Inventor | Ivan Cindrich |
| | | Southfield, Mich. |
| [21] | Appl. No. | 819,733 |
| [22] | Filed | Apr. 28, 1969 |
| [45] | Patented | Mar. 30, 1971 |
| [73] | Assignee | Chain Lakes Research Corporation |
| | | Detroit, Mich. |

[54] OPTICAL CELL FOR ATTENUATING, SCATTERING AND POLARIZING ELECTROMAGNETIC RADIATION
3 Claims, 3 Drawing Figs.

| [52] | U.S. Cl. | 350/312, 350/318 |
| [51] | Int. Cl. | G02b 5/24 |
| [50] | Field of Search | 350/312, 318 |

[56] References Cited
UNITED STATES PATENTS

| 612,937 | 10/1898 | Vebelacker | 350/312 |
| 1,234,333 | 7/1917 | Heathcote | 350/312X |
| 2,474,712 | 6/1949 | Aparicio | 350/312X |

FOREIGN PATENTS

| 584,450 | 10/1959 | Canada | 350/312 |

*Primary Examiner*—David Schonberg
*Assistant Examiner*—T.H. Kushmer
*Attorney*—Krass Hauke ABSTRACT: An optical cell for attenuating, scattering or phase shifting electromagnetic radiation such as light comprising an annular member telescopically engaged with a mounting ring to thereby define a chamber. The ends of the chamber are formed by windows supported in the mounting ring and in a cylindrical frame in contiguous relationship with the annular member. A fluid having light affecting properties fills the chamber and is transferable between the chamber and a reservoir in fluid communication with the chamber. Telescopic operation of the optical cell varies the length of the fluid light path between the windows, to thereby cause variable attenuating and the like effect upon traversing light.

PATENTED MAR 30 1971
3,572,907
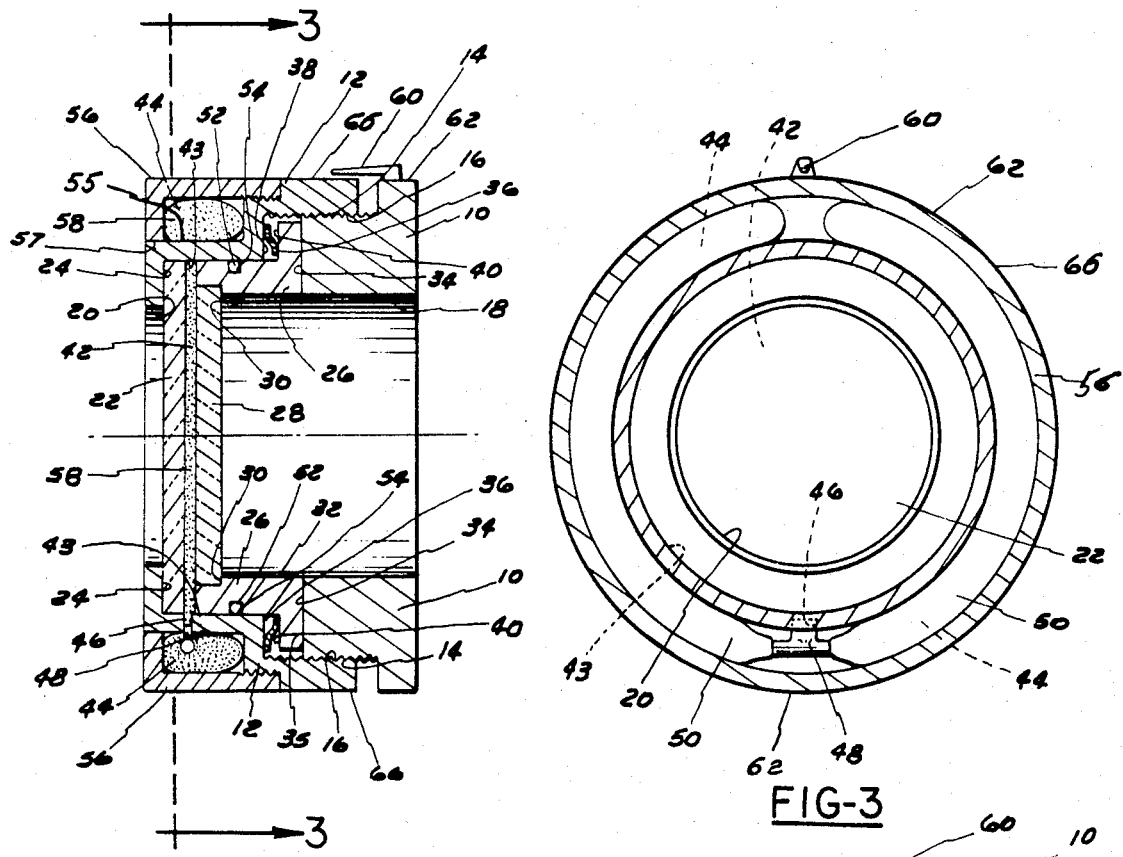
FIG-1
FIG-3
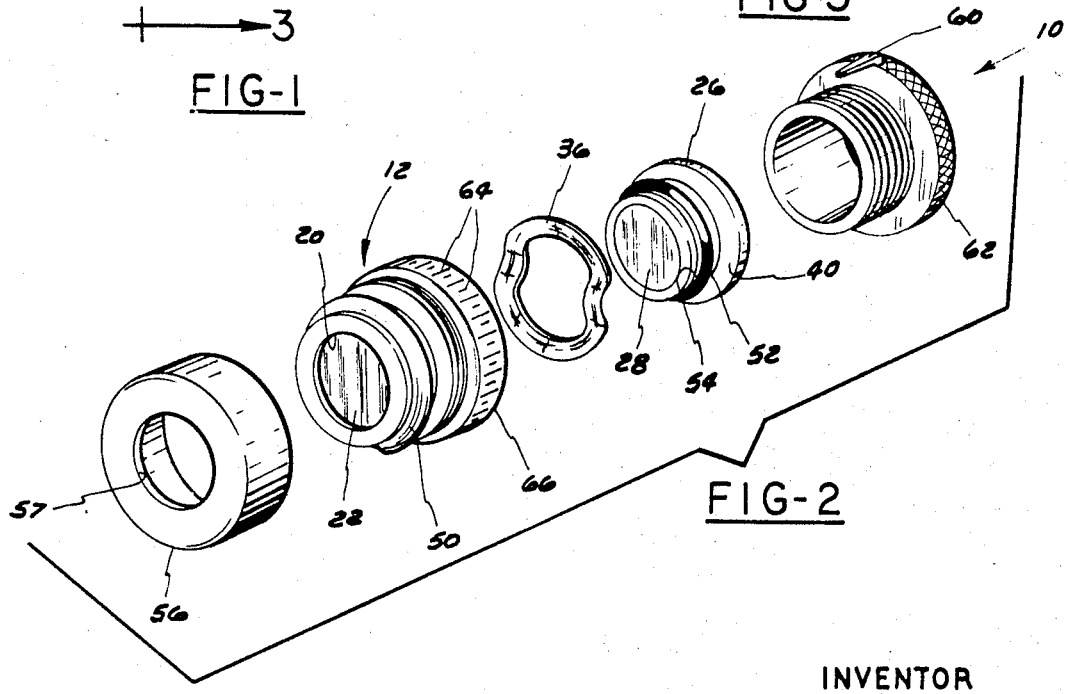
FIG-2
INVENTOR
IVAN CINDRICH
BY
Hauke Knaus Gifford & Patalidis
Attorneys

OPTICAL CELL FOR ATTENUATING, SCATTERING AND POLARIZING ELECTROMAGNETIC RADIATION

BACKGROUND OF THE INVENTION

1. Field of the Invention

This invention relates to an optical apparatus for scattering, polarizing or attenuating electromagnetic radiation and, in particular, to a telescopic optical cell defining a variable length chamber filled with a fluid having properties affecting light traversed therethrough.

2. Description of the Prior Art

Devices for variably controlling the intensity and quality of light passing through a chamber filled with fluids having light affecting properties are generally of the reflective or traversing type. In the reflective type, control is generally accomplished by varying the capacity of the chamber to thereby vary the length of the light path to and from a reflective surface. The traversing type generally has a fixed length chamber and the light beam is passed through an entrance window, the fluid in the chamber and an exit window, and the density or other properties of the fluid is modified to variably attenuate or control the light passed therethrough. As is quite obvious, the task of transferring and exchanging fluids or varying fluids qualities to control light passage is somewhat involved and tedious.

U.S. Pat. No. 1,234,333, issued to H. L. Heathcote on Jul. 24, 1917, discloses a temperature determining device defined by a variable length liquid filled chamber disposed in the path of a light beam. However, the minimum extent to which the length of the chamber is capable of being decreased is limited, since the liquid in the chamber can not be discharged to the outside of the closed chamber, and the excess liquid causes considerable bulging of the elastic walls of the chamber. The minimum light path length through the liquid is controlled by the permissible bulging of the sidewalls of the chamber to accommodate the liquid forced outwardly as the light inlet and outlet windows are drawn nearer to each other. Therefore the device disclosed in the Heathcote patent is not capable of providing wide range variation of light intensity or quality control.

SUMMARY OF THE INVENTION

Accordingly, there is need for an apparatus for variably attenuating, phase shifting or scattering electromagnetic radiation from a few percent to 100 percent. The present invention provides such an apparatus and includes telescopable elements defining a variable length chamber, having light inlet and exit windows separated by a distance continuously adjustable from zero upwards. The chamber is in fluid communication with a reservoir adapted to receive a light affecting fluid from the chamber and to discharge fluid thereto when the elements are telescoped relative to each other to change the chamber length and thereby the light path length through the affecting fluid.

The optical apparatus of the present invention is particularly useful since inlet and exit windows forming the ends of the variable length chamber maintain their parallelism during operation and are controllable to be disposed in close juxtaposition relationship with each other to thereby substantially eliminate all the light affecting fluid from the path of the traversing light. A particular embodiment, to accomplish this end, comprises two cylindrical elements, each supporting a transparent window, engaged in telescopic relationship to define a chamber between the windows. The chamber is in fluid communication with a reservoir which expands and contracts to receive from and discharge to the chamber a fluid having light affecting properties. Indicia marks are disposed on the exterior surfaces of the cylindrical elements to provide rotational positional information.

BRIEF DESCRIPTION OF THE DRAWINGS

The description refers to the accompanying drawings in which like reference characters refer to like parts throughout the several views, and in which:

FIG. 1 is an axial longitudinal cross-sectional view of an example of an optical apparatus in accordance with the principles of the present invention;

FIG. 2 is an exploded view of the optical device illustrated in FIG. 1; and

FIG. 3 is a transverse view along line 3-3 of FIG. 1.

DETAILED DESCRIPTION OF THE PREFERRED EMBODIMENT

As illustrated in FIGS. 1—3, an example of structure according to the principles of the invention comprising an annular member 10 telescopically engaged within a housing or mounting ring 12 at the complementary threaded outer surface 14 of reduced diameter of the annular member 10 and enlarged diameter threaded bore surface 16 of the mounting ring 12, respectively. The engaged threads are preferably of an extra fine series having a close tolerance and a relatively small pitch to provide for fine adjustment. The annular member 10 and the ring 12 are of any suitable material but preferably of stainless steel, brass, and the like. The annular member 10 and the ring 12 define optical apertures 18 and 20, respectively. The aperture 20 is covered by a circular transparent window 22, which is affixed and sealed fluid tight to the mounting ring 12 at annular recess 24.

A cylindrical frame 26 having a transparent window 28 affixed and sealed fluid tight at one end thereof is slidably disposed within the inner bore 43 of the ring 12, an annular surface 35 of the frame 26 on the other end thereof normally engaging an annular surface 34 on the end of the annular member 10 disposed within the ring 12. The window 28 is supported in the frame 26 at an annular recess 30 thereof such as to cover a concentrically located aperture 32. An undulated spring washer 36 is disposed surrounding a reduced outer diameter portion of the frame 26 and is disposed between an annular surface 38 of the ring 12 and an annular surface 40 of the frame 26 so as to force the annular surface 35 of the frame 26 against the annular end surface 34 of the annular member 10. During telescopic operation when the annular member 10 is rotated, generally slippage occurs between the annular member 10 and the frame 26 at the annular surfaces 34 and 35. This structural arrangement is particularly adapted to maintain parallelism between the windows 22 and 28 during telescopic operating of the annular member 10 relatively to the ring 12 by rotation of one element relatively to the other.

A chamber 42 of cylindrical shape is thus defined between the windows 22 and 28 and the inner wall 43 of the ring 12, the chamber 42 being of variable capacity and variable length as the result of the telescopic motion of the annular member 10 and the frame 26 within the ring 12.

As is obvious, the distance between the annular recess surface 40 of the frame 26 and the annular surface 38 of the ring 12 is at any one time greater than the distance between the windows 22 and 28 in order to allow space for the spring washer 36 and particularly to permit the windows 22 and 28 to engage each other. When that latter condition exists, the length of the chamber 42 is nil. It will be appreciated also that the width of the annular surfaces 38 and 40 must be great enough to accommodate therebetween the spring washer 36 when it is in a flattened condition, as the spring washer 36 has a larger diameter when flattened than when unflattened.

As best illustrated in FIG. 3, the chamber 42 is filled with a fluid 58 and is in fluid communication with a closed reservoir 44 through a port 46 and a tee connector 48 preferably made of stainless steel, bronze, brass, plastic or the like material and which is press fitted fluid tight in the port 46. The reservoir 44 is preferably formed by a pair of resilient bladders 50, made of rubber or elastic material so as to maintain at all time, a slight positive pressure on the fluid 58 and shaped to fit the circumferential exterior surface of the ring 12. The bladders 50 are sealed fluid tight in any suitable manner to the branches of the tee connector 48.

Although two bladders 50 are shown, it is readily apparent that by replacing the tee connector 48 by an L-shaped connector, a single bladder may be used. It will be appreciated that the port 46 is opened to the chamber 42 even when the windows 22 and 28 are in contiguous relationship in order to provide a fluid inlet and outlet path to the bladders 50 at all times. The chamber 42 is sealed fluid tight at the inner bore surface of the ring 12 surface 43 by a sealing O-ring 52 channeled in an annular groove 54 of the frame 26. Telescopic operations of the annular member 10 and the frame 26 within the ring 12 causes the O-ring 52 to slide or roll effectuating a fluid tight seal.

For protective and aesthetic reasons and convenience of handling, a cup-shaped cover 56 with an appropriate aperture 57 adapted to generally encircle the reduced diameter outer portion 55 of the mounting ring 12 as best seen in FIG. 1, is threadably engaged with the mounting ring 12. The cover 56 protectively covers the tee connector 48 and the bladders 50 that are disposed between the reduced outer diameter portion of the mounting ring 12 and the inside of the cover 56.

The fluid 58 filling the chamber 42 and the bladders 50 is selected on the basis of the effect desired on the electromagnetic radiation traversing the chamber 42. It will also be appreciated that the windows 22 and 28 can be made of any appropriate quality material and construction to further affect, if so desired, the electromagnetic radiation, such as light passing through the chamber 42. A typical fluid for attenuation of light is a liquid having suspended light particles, such as ink, dye, or the like.

As is well known, the amount of attenuation, polarization, or scattering of electromagnetic radiation, such as light projected through the chamber 42, is dependent on the type of fluid and the type and size of the particles in the fluid. A suitable scattering liquid fluid consists of a suspension of spherical plastic particles of accurate shape and predetermined diameter, which are available in several sizes, the size of the particles determining the degree of scattering of light. Liquid crystal material may also be used and may be additionally affected, for example, by an electric field applied between the inner surfaces of windows 28 and 22 which, may be suitably coated to act at transparent electrode surfaces. To achieve other results, such as emitting light spontaneously, active liquids or particles in liquids radiating at selected wavelengths can be used. In addition liquids which emit light upon external excitation by a separate external light source may be used and therefore serve as a special light source. Furthermore, when using such liquids the window may be made partially reflective toward the inside of the chamber 42 and therefore serve as a liquid laser cavity of variable length.

A rotational positional indicating pointer 60 is attached on the outermost surface 62 of the annular member 10. The surface 62 is knurled for positive gripping and control. The pointer 60 indexes with indicia marks 64 scribed on the outermost surface 66 of the mounting ring 12.

In operation, the annular member 10 and the mounting ring 12 are telescopically operable relative to each other in rotatable fashion through engagement at the threaded surfaces 14 and 14 from a substantially midposition illustrated in FIG. 1, to a closed position (not shown) where the inner surfaces of the windows 22 and 28 are substantially in contact to an extended position (not shown) where the inner surfaces are spaced-apart a substantial distance. Accordingly, in the closed position, little, if any, of the fluid 58 remains between the inner surfaces of the windows 22 and 28 and the effect produced by the fluid upon the passing light are minimal.

The maximum extended position is determined by the limitations of the structure dependent upon the liquid selected for use and the light effect desired. It is obvious that the effect upon the traversing light is increased as the length of the chamber 42 is increased.

When the windows 22 and 28 are brought together as a result of the rotation of the annular member 10 relatively to the mounting ring 12 in an appropriate direction, the volume of the chamber 42 is reduced and part of the fluid 58 is displaced into the resilient bladders 50 which are thus caused to expand. When the windows 22 and 28 are moved apart the volume of the chamber 42 increases, and the fluid 58 is caused to flow from the bladders 50 into the chamber 42, the walls of the bladders elastically contracting.

The invention is adaptable to many uses and applications. For example, a unit according to the present invention can be provided with appropriate electrical electrodes for applying electric or magnetic fields upon particles in the liquid to thereby further control and affect the traversing electromagnetic radiation. Additionally, several cells each consisting of an optical element according to the present invention can be ganged to progressively affect light traversed therethrough or to house various dyes for selectively "Q-switching" lasers, or to selectively control various colors, or wavelengths, of a multicolor light beam.

Having thus described the invention by way of an illustrative example of a practical embodiment, what is claimed as new is:

I claim:

1. An optical cell of variable effective axial length comprising in combination: a first annular collar, a first transparent planar window member carried by the first collar to define one axial end of the cell, a second annular collar disposed radially over and sealingly engaging the first collar, a second transparent planar window member carried by the second collar to define the other axial end of the cell, means for effecting relative axial displacement between the first and second annular collars to vary the axial dimension of the volume between the transparent window members, a third annular member disposed radially over and fixed to the second collar and defining a closed annular space externally surrounding the second collar, extensible annular bladder means disposed in the space, a fluid conduit extending radially through the second collar from said volume to said bladder means to permit the passage of fluid therethrough in both direction, and a radiation attenuating fluid in said volume and in said bladder means.

2. The optical cell defined in claim 1 wherein said means for effecting relative axial displacement between the first and second annular collars comprises a fourth annular member threadedly engaging the second collar and axially abutting the first collar, and means for effecting an axial bias between the first and second collars.

3. The optical cell defined in claim 1 wherein said bladder means comprises a pair of substantially identical semicircular extensible bladders disposed in said space in oppositely symmetrical relation, said fluid conduit comprising a T-shaped fitting having terminal ends in fluid communication with respective bladders.